United States Patent [19]

Shono et al.

[11] 4,281,913

[45] Aug. 4, 1981

[54] CAMERA CAPABLE OF COMMONLY USING STANDARD FILM AND 70 MM

[75] Inventors: Tetsuji Shono, Kawagoe; Takumi Kobayashi, Tokyo, both of Japan

[73] Assignee: Asahi Kogaku Kogyo Kabushiki Kaisha, Tokyo, Japan

[21] Appl. No.: 155,820

[22] Filed: Jun. 2, 1980

Related U.S. Application Data

[63] Continuation of Ser. No. 16,698, Feb. 28, 1979.

[30] Foreign Application Priority Data

Feb. 28, 1977 [JP] Japan .................. 52-22315

[51] Int. Cl.³ .............. G03B 17/00; G03B 1/48; G03B 17/26; G03B 19/06
[52] U.S. Cl. .................. 354/203; 354/210; 354/216; 354/275; 352/78 R; 352/79; 352/224
[58] Field of Search ............ 354/159, 202, 203, 210, 354/216, 275, 104; 352/72, 73, 78-80, 224

[56] References Cited

U.S. PATENT DOCUMENTS

| 2,522,387 | 9/1950 | Livens .................. 354/159 |
| 3,395,965 | 8/1968 | Teshi et al. .................. 352/79 X |

Primary Examiner—L. T. Hix
Assistant Examiner—Thomas H. Tarcza
Attorney, Agent, or Firm—Sughrue, Mion, Zinn, Macpeak and Seas

[57] ABSTRACT

A camera in which a standard film, 120 or 220 size is loaded behind the picture plane by using a standard film reel with film spool mounting members and means for guiding and holding the standard film and in which film back exchange is not carried out. The standard film reel is designed to be detachably mounted in the camera through an opening formed in the rear part of a reel accommodating chamber in the camera. The standard film can be replaced by a 70 mm film reel which is provided with mounting members for mounting a 70 mm film magazine outside and reel accommodating chamber and means for guiding said 70 mm film into the reel accommodating chamber and holding it therein. This is designed to be detachably mounted in the camera to thereby allow said camera to commonly use standard film and 70 mm film.

9 Claims, 5 Drawing Figures

F I G. 1
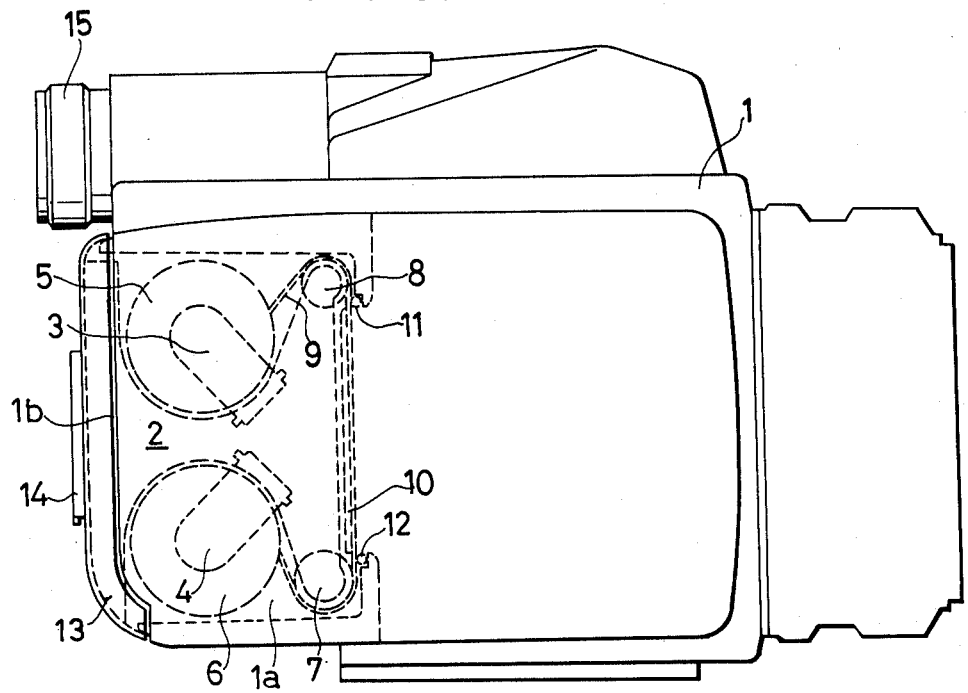
F I G. 3A
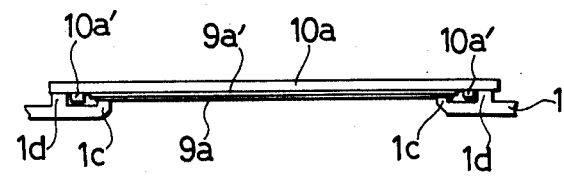
F I G. 3B
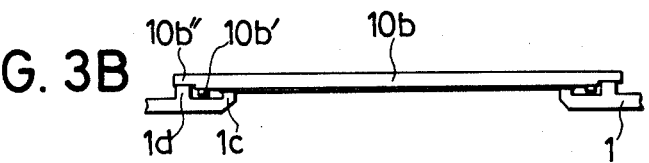
F I G. 3C
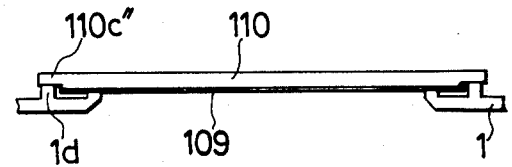

CAMERA CAPABLE OF COMMONLY USING STANDARD FILM AND 70 MM

This is a continuation of application Ser. No. 016,698, filed Feb. 28, 1979.

BACKGROUND OF THE INVENTION

In general, a camera is designed to use films equal in width. However, some cameras using "Brownie" type films are designed so that they can be able to use both a Brownie film (120 film and 220 film) and a 70 mm film. In this case, the cameras should be of a so-called "film back change type", because of the following reasons:

(i) The width of the leader paper of the 120 film is about 63 mm, and that of the 70 mm film is 70 mm. Accordingly, in ordinary cases, it is impossible to commonly use the mechanism adapted to maintain the film flat for both of the films.

(ii) The spool (about 25.4 mm$^\phi$ × 66 mm$^h$) of the Brownie type film is much smaller in size than the magazine (about 41 mm$^\phi$ × 76 mm$^h$ in the case of a 15 ft. roll) of the 70 mm film. Accordingly, the space occupied by the film accommodating section in the camera is necessarily sized for the 70 mm film, which results in an increase of the size of the camera.

The above-described film back exchange type camera is advantageous in that the film can be exchanged under ambient light conditions, but it is still disadvantageous in the following areas:

(1) Since the rail surface is on the side of the exchange back, it is necessary to precisely maintain the relationship between the camera and the exchange back.

(2) For the shutter on the side of the camera body and/or the film on the side of the film exchange back, it is necessary to provide a security measure when coupled prior to winding.

(3) Because it is necessary and required to provide a counter mechanism on the side of the film exhchange back, the control and cooperation of the shutter winding mechanism and the release mechanism on the side of the camera body become intricate. In addition, a counter mechanism must be provided in each film exchange back.

(4) It is required to provide a movable light intercepting member for the film exchange back. It is necessary to provide security means so that the film exchange back itself is not exposed to light or the film is not exposed to light erroneously as the case may be and that it can be loaded in the camera without being exposed to light.

Accordingly, the cost of such a camera is greatly increased; that is, the camera is necessarily expensive.

In order to reduce the cost of the camera, a method has been considered in which the camera body is integral with the film exchange back (in this case, the advantages and disadvantages thereof are the reverse of those of the above-described back exchange type camera). If, in this case, the camera is intended to commonly use the Brownie film and 70 mm film, then as was described the space of the film accommodating section in the camera is determined for the 70 mm film, and therefore the size of the camera is necessarily increased. At present, Brownie type films are used much more frequently than 70 mm films. Therefore, such a large size camera is lower in commercialization potential, although it may be suitable for the picture taking case where it is required to take as many as possible without exchanging the film. Accordingly, heretofore, no 70 mm film is useable for the camera which uses a Brownie type film and carries out no film back exchange.

On the other hand, in a camera in which a Brownie type film is loaded behind the picture plane, the film path is in the form of a Greek character omega "Ω". Accordingly, in order to facilitate film loading, such a camera is, in general, designed so that it is provided with a reel having means for mounting the spool of a Brownie film and means for guiding and holding the film, and the reel is detachably mounted in the reel accommodating chamber in the camera.

SUMMARY OF THE INVENTION

According to this invention, a camera is provided in which no film back exchange is carried out and a Brownie type film is loaded behind the picture plane by using a Brownie film reel which can be detachably mounted on the camera and an opening is provided in the rear part of the Brownie film reel accommodating chamber in the camera. A 70 mm film reel having means for mounting a 70 mm film magazine outside the reel accommodating chamber and means for guiding the 70 mm film from the magazine into the reel accommodating chamber and holding there is mounted in the camera from which the Brownie film reel has been removed. Hence the 70 mm size film can be used without increasing the physical size of the camera.

Furthermore, this invention is intended to provide a method in which the reel is made integral with the rear cover to make it simpler to load or unload the film. Also, this will prevent the film from shifting in the widthwise direction which may be caused when films different in width are commonly used in the camera.

This invention will be described with respect to the accompanying drawings and the description of the preferred embodiment that follows.

BRIEF DESCRIPTION OF THE DRAWINGS

FIG. 1 is a side view of a camera in which a Brownie type film reel is mounted;

FIG. 3 is a diagram for a description of a method of preventing a film from shifting in the widthwise direction.

DESCRIPTION OF THE PREFERRED EMBODIMENT

Figure 2:
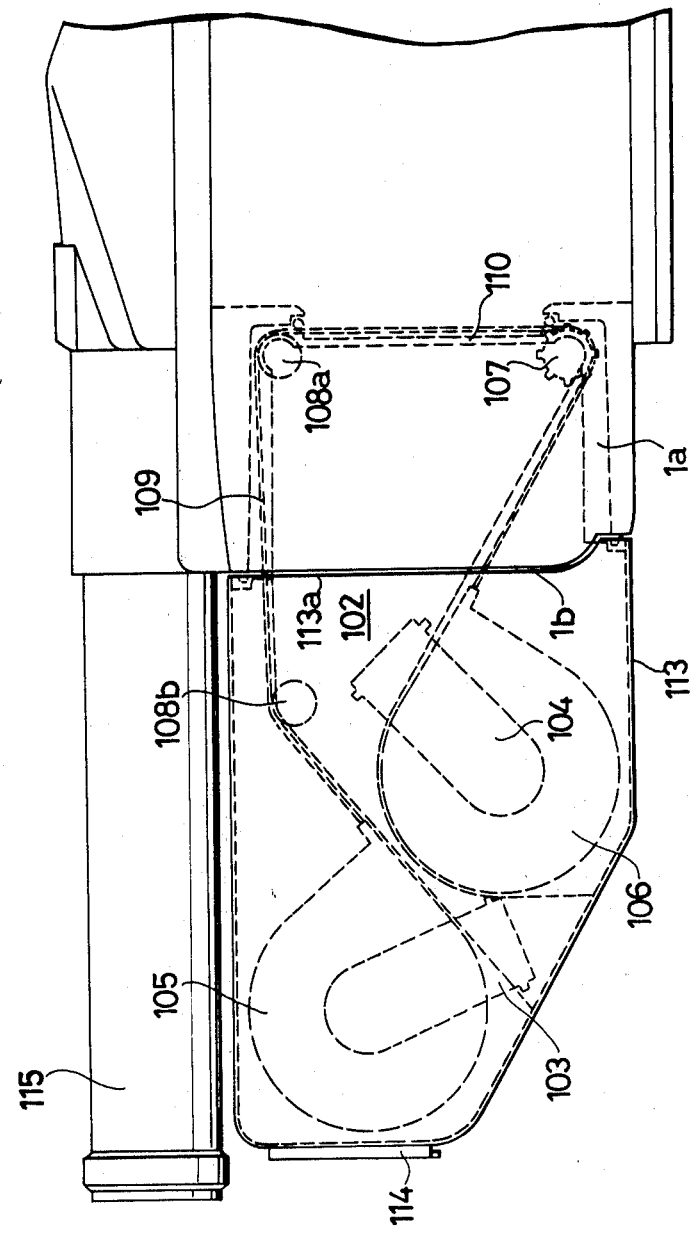
FIG. 2 is a side view of the camera in which a 70 mm film reel is mounted.

FIG. 1 is a side view of a camera in which a Brownie type film reel is mounted. Referring to FIG. 1, the Brownie film reel 2 is accommodated in the reel accommodating chamber 1a of the camera 1. The reel 2 is provided with spool mounting members 3 and 4 on which an empty spool 5 and a film-loaded spool 6, on which a new (not used yet) film is loaded, are mounted respectively. A counter roller 7 and a guide roller 8 are rotatably mounted on the Brownie film reel 2 so that a film 9 is guided and held. The counter roller 7 is in association with a counter (not shown). More specifically, since the counter roller 7 is rotated by the advance movement of the film 9, the counter is operated. A film pressure plate 10 is mounted on the Brownie film reel 2 by means of a pressure plate spring (not shown). That is, the pressure plate spring causes the film pressure plate 10 to be depressed to the right as viewed in the figure at all times so that the film 9 abuts against the surface of a rail (not shown) fixedly mounted on the camera 1. Rollers 11 and 12 are rotatably mounted on the camera 1 to keep the film in one plane. The camera 1 has an opening 1b at the rear end.

Provided in this opening 1b is a Brownie film rear cover 13 to prevent light from entering the reel accommodating chamber 1a. The Brownie film rear cover 13 and the Brownie film reel 2 form one unit. The empty spool 5 is engaged with a gear coupled to a spool winding device (not shown) which is provided at a position opposite to the position of the spool mounting member 3. The gear is engaged with a winding gear (not shown) provided in the camera 1 to wind the film.

As described above, the reel 2 and the rear cover 13 form one unit. Therefore, the reel 2 and the rear cover 13 can be mounted on the camera or removed therefrom in one action. Thus, in the case of using a 70 mm film, it is unnecessary to keep a Brownie film rear cover and a Brownie film reel separately.

Exposed film can be replaced as follows: A locking mechanism (not shown) between the Brownie film reel 2 and the camera 1 is released by manually operating a lock operation member 14 provided on the Brownie film rear cover 13. Then, the assembly of the Brownie film reel 2 and the Brownie film rear cover 13 is pulled backward. The spool 5 on which the film has been wound is removed by using the spool mounting member 3. The emptied spool 6 is mounted in place of the spool 5 thus removed, and the spool of a new film is mounted on the spool mounting member 4 where the emptied spool 6 was. Then, after the leader paper of the new film has been wound around the counter roller 7 and the roller 8, it is inserted into the empty reel 5. Thus, replacement of the exposed film can be achieved. As is apparent from the above description, in the case where a film is loaded behind the picture plane, the film path is in the form of a Greek character omega "$\Omega$", and therefore it is impossible to conduct film loading with the spools fixed in the camera. Thus, it is necessary that that the reel be designed so that it can be detachably mounted on the camera.

FIG. 2 is a side view of the camera on which a 70 mm film reel is mounted. Referring to FIG. 2, a 70 mm film reel 102 is arranged over the reel accommodating chamber 1a of the camera 1 and the opening 1b and extends behind the opening 1b. The reel 102 is provided with magazine mounting members 103 and 104 on which an empty magazine 105 and a magazine 106, in which a new (not used yet) film has been loaded, are mounted. A sprocket 107 and guide rollers 108a and 108b are rotatably mounted on the 70 mm film reel 102 to guide and hold the film 109. The sprocket 107 is in association with a counter (not shown) in a manner that, as the sprocket 107 is turned by the movement of the film 109, the counter is operated. A film pressure plate 110 is mounted on the 70 mm film reel 102 by means of a pressure plate spring (not shown) so that the pressure plate spring depresses the film pressure plate 110 to the right as viewed in the figure at all times thereby to abut the film 109 against the surface of a rail (not shown) fixedly mounted on the camera 1. A 70 mm film rear cover 113 is provided in the opening 1b to prevent light from entering the reel accommodating chamber 1a.

The rear cover 113 is secured to the 70 mm film reel 102 by means of a locking mechanism (not shown). The empty magazine 105 engages with a gear integral with a magazine winding device (not shown) provided at a position opposite to the position of the magazine mounting member. The film is introduced into the reel accommodating chamber 1a through a train of gears (not shown) arranged in the 70 mm film reel 102, and the film is wound being engaged with a winding gear (not shown) provided in the camera.

The necessary capacity of the film accommodating chamber 1a is such that it can receive a Brownie film or a 70 mm film. More specifically, the size of the film accommodating chamber 1a is increased in width as much as the difference, or 4 mm, between the length 66 mm of the spool of a Brownie film and the width 70 mm of a 70 mm film, but the height and depth are equal to those in a camera using only Brownie type films. Therefore, although the camera can use a 70 mm film, the size of the camera is not increased.

Film exchange can be achieved as follows: A locking mechanism (not shown) between the 70 mm film reel 102 and the camera 1 is released by manually operating a lock operation member 114 provided on the rear cover 113. Then, the assembly of the 70 mm film reel 102 and the 70 mm film rear cover 113 is pulled backward. Thereafter, the locking mechanism locking the assembly of the 70 mm film reel 102 and the 70 mm film rear cover 113 is released so that the 70 mm film reel 102 is pulled out through a front opening 113 of the 70 mm film rear cover.

The magazine 105 on which the film has been wound is removed by operating the magazine mounting member 103 and the emptied magazine 106 is also similarly removed. A new magazine loaded with new film is set at the position indicated by numeral 106 in the figure. After the end portion of the new film is connected to the aforementioned emptied magazine, the emptied magazine is set at a position indicated by numeral 105 in the figure. The 70 mm film reel 102 is inserted through the opening 113a of the 70 mm film rear cover 113 and is locked in the camera 1. In order to facilitate the film exchange operation, the 70 mm film rear cover 113 is detachably mounted on the 70 mm film reel 102.

Referring back to FIG. 1, a finder eye piece 15 is designed so that it can be detachably mounted on the camera and can be replaced by an extension type finder eye piece 115 as shown in FIG. 2 to facilitate the use of a 70 mm film.

FIG. 3 is a sectional view for a description of a method of preventing a film from shifting in the widthwise direction.

The FIG. 3(A) illustrates the case of a 120 film. Inner rails 1c and outer rails 1d are provided in a camera 1, and a film 9a abuts against the inner rails 1c. A film pressure plate 10a abuts against the outer rails 1d, and a leader paper 9a' is interposed between the film pressure plate 10a and the film 9a. Shifting preventing members 10a' integral with the pressure plate 10a serve to prevent the film 9a and the leader paper 9a' from shifting.

FIG. 3(B) illustrates the case of a 220 film. In this case, the difference in step between the inner rail 1c and the outer rail 1d is increased since the film has no leader paper. Therefore, steps 10b' are added to the film pressure plate 10b. Except for this change, the function of the shifting preventing members 10b' is similar to that of the shifting preventing members 10a' shown in FIG. 3(A).

The film can be prevented from shifting by providing the shifting preventing members 10a' or 10b' on the film pressure plate 10 as described above. However, the same effect can be obtained by providing collars on both ends of each of the counter roller 7 and the guide roller 8 or by maintaining the positions of the spools 5 and 6 in accurate registration.

FIG. 3(C) illustrates the case of a 70 mm film. The arrangement shown in FIG. 3(C) is fundamentally similar to those shown in FIGS. 3(A), and 3(B). The provision of steps 110c″ in the film pressure plate 110 is due for the same reasons as in FIG. 3(B). However, the arrangement shown in FIG. 3(C) is different from those in FIGS. 3(A) and 3(B) in that the film is prevented from shifting by means of the inside surfaces of the outer rails 1d. In this case, the shifting preventing members are not limited to the outer rails 1d. That is, they may be replaced by pins fixedly secured to the camera body 1 or rollers rotatably mounted on the camera body 1.

As is apparent from the above description, according to this invention, in a camera in which a Brownie film is loaded behind the picture plane and film back exchange is not carried out, the film of a 70 mm film magazine is guided into the reel accommodating chamber from which the reel, essential for facilitating film loading and detachably mounted on the camera, has been removed. The magazine is arranged behind the reel accommodating chamber, and the rear cover is integral with the reel, thereby eliminating troublesome operation.

In addition, shifting preventing members are provided on the reel side for a Brownie type film of long width, and also are provided on the camera body side for a 70 mm film of short width, thereby preventing the film from shifting. Thus, a small camera capable of using a 70 mm film can be provided according to the invention, whose operability is substantially equivalent to that of the camera using only 70 mm films, and also use a Brownie type film, although it is not of the film back exchange type.

It is apparent that other modifications may be made without departing from the scope thereof.

What is claimed is:

1. In a camera in which a 120 or 220 type film is loaded behind a picture plane by using a compatible film reel with a compatible film spool, mounting members and means for guiding and holding said 120 or 220 type film, and wherein the camera is not of the film back exchange type, the improvement comprising: said compatible film reel designed to be detachably mounted on said camera, said camera having an opening formed in the rear part of a reel accommodating chamber in said camera through which opening said compatible reel may be detached; said reel being contained entirely within said reel accommmodating chamber; said reel replaceable by a 70 mm reel provided with mounting members for mounting a 70 mm film magazine outside said reel accommodating chamber, and means for guiding 70 mm film from said magazine into said reel accommodating chamber and holding it therein, said means for guiding configured to be detachably mounted on said camera; whereby said camera commonly uses 120 or 220 type film and 70 mm film.

2. A camera as defined in claim 1, wherein said compatible film reel and a film rear cover form a single unit at least when mounted on said camera or removed therefrom, and said 70 mm film reel and a 70 mm film rear cover form a single unit, at least when mounted on said camera or removed therefrom.

3. A camera as described in claims 1 or 2 further comprising 120 or 220 type film shifting prevention means for preventing shifting of the film in the widthwise direction, said 120 or 220 film shifting prevention means provided on said compatible reel, and 70 mm film shifting prevention means provided in said camera body.

4. A camera as defined in claim 3 wherein said means for guiding and holding said 120 or 220 type film comprises a counter roller receiving film from a supply reel and a guide roller directing said film onto a take-up reel.

5. A camera as defined in claim 4 further comprising a pressure plate interposed between said counter roller and said guide roller.

6. The camera of claim 5 wherein said 120 or 220 type film-shifting prevention means comprises a plurality of shift preventing members on said pressure plate.

7. The camera as defined in claim 1 wherein said means for guiding and holding said 70 mm film comprises a sprocket gear and a plurality of guide rollers.

8. The camera as defined in claim 7 further comprising a pressure plate interposed between said sprocket gear and said guide rollers.

9. The camera as defined in claim 8 further comprising a 70 mm film-shifting prevention means having a plurality of rails disposed on said camera.

* * * * *